April 5, 1960  E. BURRELL  2,931,848
BREAKER MECHANISM FOR DEFERRED-ACTION ELECTRICAL BATTERIES
Filed Sept. 25, 1947

INVENTOR
ELLIS BURRELL
BY
ATTORNEY

United States Patent Office 2,931,848
Patented Apr. 5, 1960

2,931,848

BREAKER MECHANISM FOR DEFERRED-ACTION ELECTRICAL BATTERIES

Ellis Burrell, Rochester, N.Y., assignor to the United States of America as represented by the Secretary of the Navy Application September 25, 1947, Serial No. 776,055

10 Claims. (Cl. 136—90)

This invention relates generally to deferred action batteries of the type employing a frangible ampoule of electrolyte surrounded by a vertically arranged stack of electrodes, and more particularly to an improved breaker mechanism for said ampoule.

To render a deferred action battery operable, for actuating an electrically actuated fuze, such as for example a proximity fuze, it is necessary that the ampoule be shattered for freeing the electrolyte to flow betwen the electrodes. In the art, one method for breaking the ampoule involved the use of inertial forces for either shifting the ampoule into contact with a breaker mechanism located therebeneath, or for shifting said breaker mechanism into contact with said ampoule. This method was found to be unsatisfactory for use with projectiles of the type fired by mortars, or with rockets, because of the small inertial forces present in these projectiles at the time of projection thereof. Moreover, this method also failed to provide an adequate safety factor because the jolts and jars encountered during handling of the projectiles sometimes were sufficient to cause premature ampoule breakage. Another method which has been used employed a breaker pin driven against the ampoule by the blast of a small powder charge. This method also was found to be unsafe due to the uncontrollable characteristics of the powder charge.

Accordingly, one of the more important objects of the present invention is to provide a breaker mechanism which will effectively shatter the ampoule of a deferred action battery to insure proper activation thereof, but which will provide adequate safety means for preventing premature activation of said battery.

Another object of the invention resides in the provision of a breaker mechanism for deferred action batteries which, although entirely safe, will be positive in operation.

Further objects of the invention will become apparent as the description proceeds.

In the drawing forming a part of this application,

Figure 1:
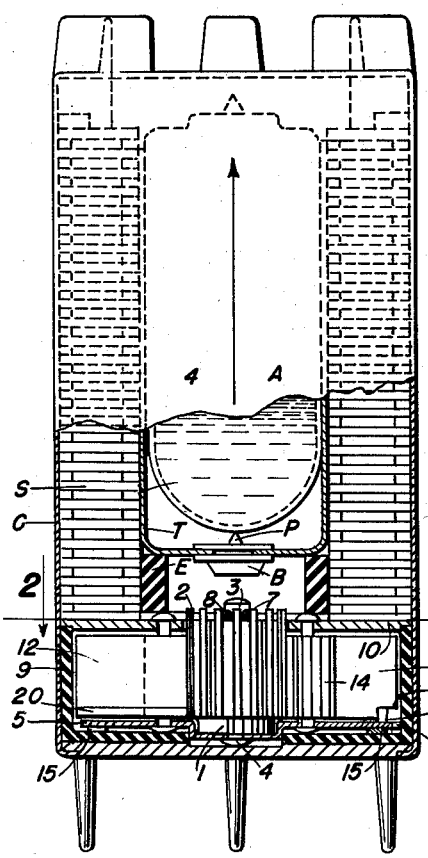
Fig. 1 is a vertical sectional view, partly in elevation, showing the improved breaker mechanism installed in a deferred action battery.

Referring now to the drawings in more detail, the letter C indicates the outer casing of a deferred action battery. The electrode, or cell, stack is shown generally at S and is positioned in surrounding relation to a frangible ampoule A, said ampoule containing an electrolyte having such composition that, when it is in contact with the electrodes, the battery will become activated. The ampoule A is mounted in a thimble T, of frangible material, and said thimble carries, axially of this bottom wall, a breaker pin P which normally impinges on the lowermost extremity of the ampoule. The breaker pin P has an anvil B integral therewith but positioned on the opposite face of the bottom wall of the thimble for engagement by the breaker sleeve, to be described hereinafter.

Figure 2:
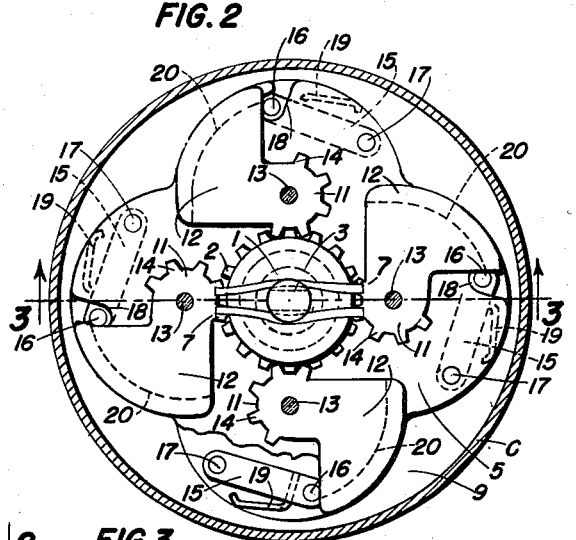
Fig. 2 is a transverse sectional view on the line 2—2 of Fig. 1.
Figure 3:
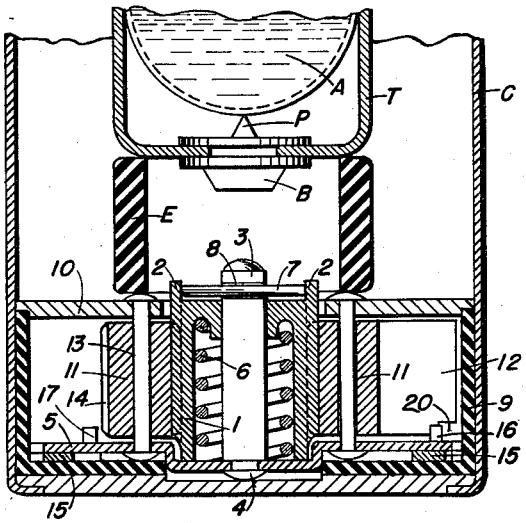
Fig. 3 is an enlarged detail sectional view on the line 3—3 of Fig. 2.

The breaker mechanism according to my invention employs a housing 9 which is mounted in the lower end of the casing C (as seen in Fig. 1 and Fig. 3) and includes a top wall 10 having an axial opening therein, a side wall and a bottom wall, the said bottom wall also being formed with an axial opening. As best seen in Fig. 2, the housing 9 is formed with a plurality of connected semi-circular recesses, the purpose for which will be made apparent hereinafter.

A mounting plate 5 is positioned in the housing 9 and has an axial projection fitted within the axial opening in the bottom plate of said housing. A post or guide pin 3 is secured in place on the plate 5 by a rivet 4 and extends upwardly to project about the housing through the opening in the top wall 10. Near its upper end the pin 3 is formed with a pair of grooves which define flats 8.

Rotatably and slidably mounted in the housing 9 and on the pin 3 is a cylindrical breaker sleeve 1 closed at its upper end by a wall defining a hub which surrounds the pin 3. A coil spring 6 is confined between the top wall of the sleeve 1 and the upper surface of the mounting plate 5. The outer surface of the sleeve 1 is provided with an annular series of gear teeth 2' which are projected upwardly beyond the plane of the upper surface of the said sleeve 1 to define detent teeth 2.

Hinge pins 13, preferably four in number, are mounted in the housing 9 near the axial openings in the top and bottom walls thereof, and have their corresponding upper and lower ends, respectively, riveted to the top wall 10 and to the plate 5. Weighted levers 12, of generally quadricircular shape, are mounted to swing on the hinge pins 13 by hubs 11. The levers, as best seen in Fig. 2, are movable in the semi-circular recesses formed in the side wall of the housing and said hubs are provided with teeth 14 which mesh with the teeth 2' on the sleeve 1. It will now be understood that centrifugal force, which will be present in a spinning projectile containing a deferred action battery equipped with my improved breaker mechanism, will be exerted on the weighted levers 12 for causing said levers to swing in their respective recesses. The swinging movement of the levers will impart partial rotative movement to the sleeve 1.

In order to retain the sleeve 1 in inoperative position against the compression of the spring 6, I provide a detent mechanism which consists of a pair of spaced, bowed wire detents 7, which have their mid-portions straddling the pin 3 in engagement with the flats 8 and have their corresponding opposite ends portions engaged between diametrically opposed detent teeth 2.

Additional safety means, for preventing premature operation of the breaker mechanism has been provided and is best seen in Fig. 2 and Fig. 3 of the drawing. This additional safety means consists of preferably four latches 15 of identical construction, one of which is provided for each of the weighted levers 12. More specifically, each of the latches 15 consists of a flat arm which has one end pivotally connected to the bottom wall of the housing 9 and has, at its other end, an upwardly directed stud 16. As best seen in Fig. 2, the arm is normally held in its innermost, or latching, position with the stud in engagement with the confronting edge of its associated weighted lever, by a spring 19. In this connection it should be understood that the mounting plate 5 is notched at its rim, as shown at 18, to permit movement of the stud to latching position. It will now be seen that the stud will, when the battery is at rest, prevent swinging movement of the weighted lever. When the battery is spinning with a projectile in flight, however, centrifugal force will act upon the latch 15 and move the arm thereof outwardly against the tension of the spring 19 for shifting the detent from its latching position in engagement with the weighted lever 12 to an unlatched position clear of said lever, for permitting the lever to swing in response to the said centrifugal forces. As best seen at 20, the weighted levers are provided with arcuate grooves to freely accommodate the stud 16 when swinging in their respective recesses.

As best seen in Fig. 1 and Fig. 3 of the drawing, the thimble T is supported in spaced relation a suitable distance above the breaker sleeve 1 by an annulus E of phenolic material.

The operation of the invention will now be briefly described.

Figure 4:
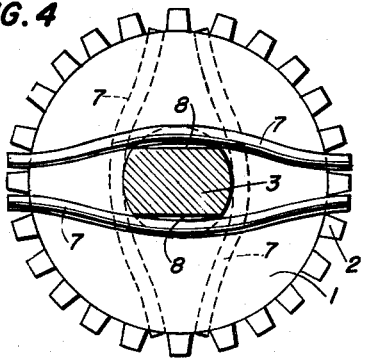
Fig. 4 is an enlarged detail top plan view, partly in section, showing the detent mechanism for the breaker sleeve employed.

Prior to firing, the mechanism is maintained in the inoperative position shown in Fig. 1 and Fig. 3 by the detents 7 and the latches 15. In this position premature release of the breaker sleeve 1 is prevented regardless of how roughly the projectile containing the battery may be handled. More specifically, the detents 7 are firmly anchored in the grooves of the pin 3 defining the flats 8, with the breaker sleeve 1 in a retracted position. The studs 16 of the latches 15 are held in locking engagement with the weighted levers 12 by the forces of the springs 19 gearing upon said latches. Thus, the weighted levers 12 are prevented from swinging to turn the sleeve 1 and release the detents 7. After the projectile, containing a battery equipped with this improved breaker mechanism, is fired, centrifugal forces set up by the spinning projectile in flight will, as previously explained, move the latches 15 against the forces of the springs 19 to inoperative position for freeing the weighted levers 12. In this position the studs 16 no longer engage the levers 12 but are accommodated by the arcuate grooves 20 in said levers. The levers 12 will then be swung about their respective hinge pins 13 in their respective recesses. By the action of the teeth 14 on the levers 12 meshing with the teeth 2' on the sleeve 1, the breaker sleeve 1 and the detents 7 are rotated, through an arc of substantially 90°, while the pin 3 remains stationary, until the detents 7 are moved to the position shown in dotted lines in Fig. 4, which is to say, out of the slots defining the flats 8. In this condition, the said detents 7 will be free to move with the sleeve 1, no longer exerting any restraining action on said sleeve. The spring 6 will then shift said sleeve upwardly into engagement with the anvil B on breaker pin P for shattering the ampoule.

I claim:

1. In combination with a deferred-action battery having an ampoule, a breaker device being resiliently urged to break the ampoule, means for initially restraining said device from breaking the ampoule, centrifugally operated means for releasing said breaker device and resilient latch means for initially restraining said centrifugally operated means from releasing said breaker device.

2. In combintion with a deferred-action battery having an ampoule, a breaker device being resiliently urged to break the ampoule, a resilient detent initially restraining said breaker device from breaking the ampoule, centrifugally operated means for releasing said detent, and a latch initially restraining said centrifugally operated means from releasing said breaker device.

3. In combination with a deferred-action battery containing a frangible ampoule, a spring driven breaker mechanism for breaking the ampoule, a pin for guiding the said breaker mechanism and provided at one end with transverse grooves, a resilient detent engaged in said transverse grooves for initially restraining the said breaker mechanism, centrifugally operated means for releasing said resilient detent, and a latch for initially restraining said centrifugally operated means in its inoperative position.

4. The combination wtih a deferred action battery having an ampoule, of a breaker mechanism for breaking said ampoule, including a breaker sleeve, a breaker pin spaced above the sleeve, a spring for driving the sleeve into engagement with the pin for breaking the ampoule, releasable means for normally retaining the sleeve in inoperative position against the compression of the spring, and means responsive to inertial forces exerted on the battery normal to its axis for releasing said last mentioned means.

5. The combination recited in claim 4, including a latch for normally retaining said last mentioned means in inoperative position, said latch being releasable by said inertial forces.

6. The combination with a deferred action battery having an ampoule, of a breaker mechanism for breaking the ampoule, including a breaker sleeve, a pin mounting the breaker sleeve for movement and having detent receiving grooves, said sleeve having detent teeth, a spring confined beneath the sleeve, a breaker pin spaced above the sleeve, detents engageable in the grooves and with the teeth, and means responsive to centrifugal force for rotating the sleeve to force the detents out of the grooves for releasing the sleeve, whereupon said spring will drive said sleeve into engagement with said breaker pin for breaking the ampoule.

7. The combination recited in claim 6 wherein said means includes a weighted lever.

8. The combination recited in claim 6 wherein said means comprises a weighted lever, and including latch means normally retaining the weighted lever in inoperative position.

9. The combination recited in claim 6 wherein said means comprises a weighted lever having a hub formed with teeth, teeth on the breaker sleeve meshing with the hub teeth, and a hinge pin for mounting the lever for swinging movement.

10. A breaker mechanism for the ampoule of a deferred action battery, including a housing having a side wall formed with a recess, a breaker sleeve in the housing and having gear teeth, a guide pin rotatably and slidably mounting the breaker sleeve and having a groove, detent teeth on the sleeve, a detent normally positioned with its midportion in the groove and its ends in engagement with the detent teeth, a hinge pin in the housing, a weighted lever mounted on the hinge pin for swinging movement in the recess and having a hub formed with teeth meshing with the gear teeth, a latch normally retaining the lever against swinging movement, said latch being releasable by centrifugal force for releasing said lever, whereby said lever will be shifted by centrifugal force for rotating the sleeve to released position with the detent out of the groove, a breaker pin engageable with the ampoule, and means for driving the released sleeve into engagement with the breaker pin for breaking the ampoule.

References Cited in the file of this patent

UNITED STATES PATENTS

| | | |
|---|---|---|
| 1,810,059 | Robertson | June 16, 1931 |
| 2,403,567 | Wales | July 9, 1946 |

OTHER REFERENCES

Kleiderer: "Modern Plastics," Nov. 1945, pages 133–136, 206.